Feb. 15, 1938.  F. C. NOLLER  2,108,608
SPEED REDUCING DRIVE
Filed May 16, 1936
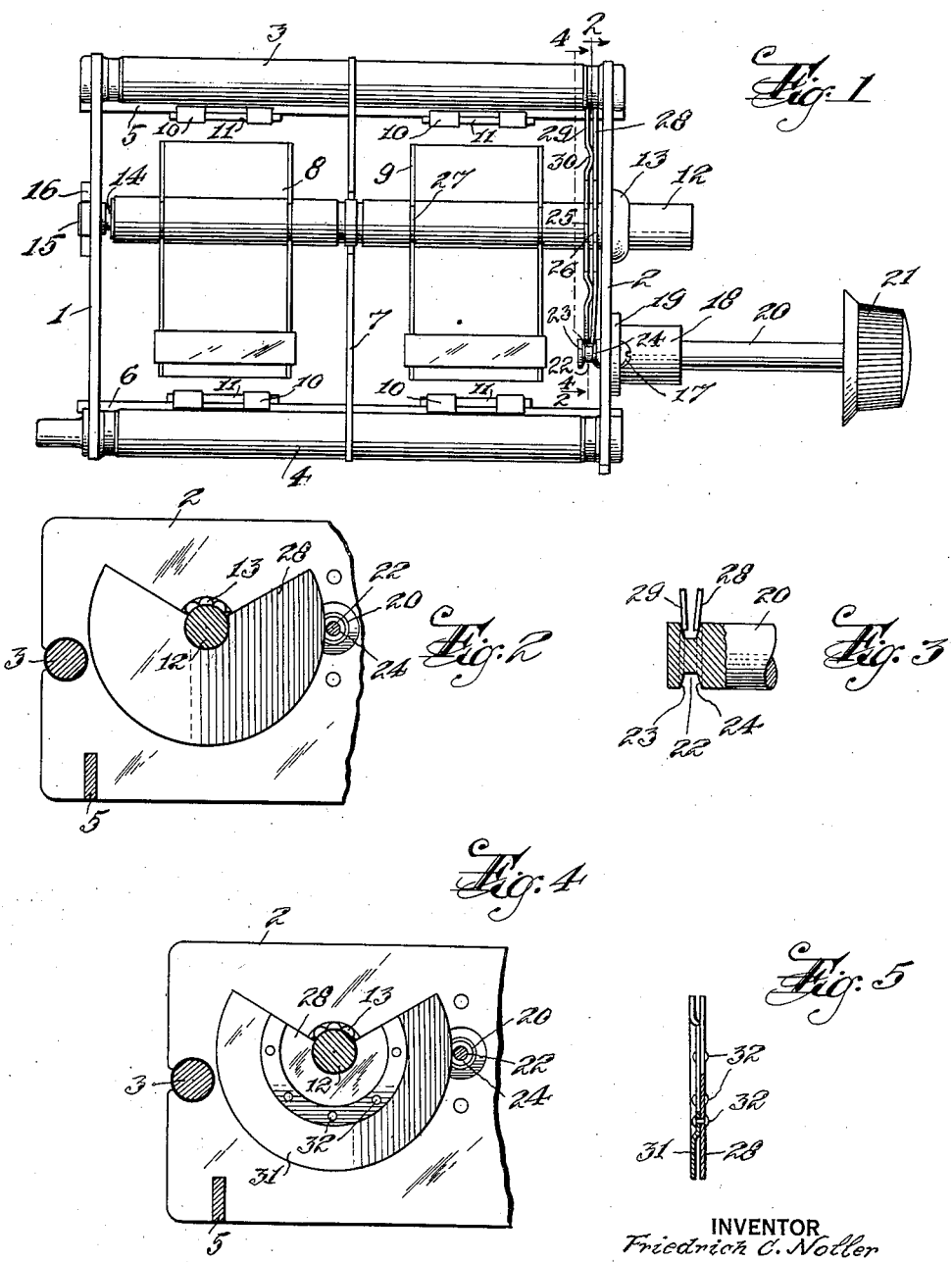
INVENTOR
Friedrich C. Noller
BY
A. D. T. Libby
ATTORNEY Patented Feb. 15, 1938

2,108,608

UNITED STATES PATENT OFFICE 2,108,608

SPEED REDUCING DRIVE

Friedrich C. Noller, Collingswood, N. J., assignor to Radio Condenser Company, Camden, N. J.

Application May 16, 1936, Serial No. 80,071

2 Claims. (Cl. 74—10)

This invention relates to a mechanism for securing a reduction in rotative speed between a driving and a driven member, and the mechanism to be hereinafter described is particularly adapted for use in connection with tuning devices such as condensers used in radio receiving sets.

I am aware of the fact that in the early days of radio broadcasting numerous devices were proposed for use as vernier drives to secure a last fine adjustment, for any given station, after a coarse or rough adjustment had previously been made. Many of these vernier drives were applied to single-unit condensers and some to gang condensers.

In more recent years, it has become practically universal to use a single drive for a gang condenser, and for this purpose, to get an accurate adjustment, various types of gearings have been used, such as worm drives and ball speed reducing devices such as illustrated, for example, in Cramer Patent 1,991,845, issued February 19, 1935.

Practically all of these prior art drive mechanisms may be considered as relatively expensive when compared with the present-day cost of an entire gang condenser, whether composed of two or more units.

It is therefore the principal object of my invention to produce a speed reducing drive which will give a high ratio of speed reduction in a very small space, and one that will operate with a very smooth, even action, yet at the same time, one that is very low in cost, much lower than the cost of any other drive mechanism for this purpose of which I am aware.

My improved form of speed reducing drive is illustrated in the annexed drawing, wherein:

Figure 1 is a plan view of a two-gang condenser, the stator group of plates not being shown.

Figure 2 is a section on the line 2—2 of Figure 1.

Figure 3 is an enlarged view of one portion of the speed reducing mechanism.

Figure 4 is a view on the line 4—4 of Figure 1, but showing a modified form of construction of that part of the speed reducing drive carried by the rotor shaft.

Figure 5 is a side view of that part of the drive shown in Figure 4, carried by the rotor shaft.

In the various views, a two-gang condenser frame is illustrated as being composed of end plates 1 and 2 held together with rods 3 and 4, and bars 5 and 6 to which they are securely anchored. A brace plate 7 is placed between the two unit condensers, only the rotors 8 and 9 of which are illustrated, although support brackets 10, carried on insulators 11 fastened to the bars 5 and 6, are shown for supporting the cooperative groups of stator plates. The rotor plates 8 and 9 are carried on the shaft 12, supported in the front plate 2 by suitable anti-friction bearings 13, such as shown in Cramer Patent 1,800,719, issued April 14, 1931; and on the rear plate 1 by a similar type of bearing, or a single ball 14 carried on an adjustable stud 15 locked in place by a lock-nut 16.

The end plate 2 has fastened thereto, in any satisfactory manner as by screws 17, a bushing member 18 having a flange 19. Supported by the bushing 18, is an operating shaft 20 having an operating knob 21 fastened thereto. The inner end of the shaft 12 has a specially formed groove 22, the sides 23 and 24 of which are generally conical in shape.

As shown in Figures 1 and 2, the rotor shaft 12 is provided with a pair of grooves 25 and 26. The grooves 25 and 26 are preferably cut at the same time and the same width as the grooves 27 in the rotor shaft for the rotor plates 9. Mounted in the groove 26, is a flat plate 28, and in the groove 25, another cooperative plate 29. These plates may be fastened in their respective grooves in any satisfactory manner as by staking or soldering. The plates 28 and 29 are made of resilient material, preferably of steel which will take a temper, and the plate 29 has an annular recess or depression 30 formed therein so that it engages or rests against the plate 28, thereby forming an arcuate fulcrum line around or on the plate or disc 28, so as to produce a sufficient spring tension when the end of the drive member 20 is installed in position as shown in Figure 1. As will be seen from Figure 2, the plates or discs 28 and 29 are preferably considerably more than 180° in arcuate length, so that they will never become disengaged from the groove 22 as the rotor plates are turned through 180° of movement. It may be noted in passing that the conical sides of the groove 22 assist in making the original engagement with the discs or plates 28 and 29.

In the form shown in Figures 4 and 5, only one disc 28 is used. However, an annular segment 31 is fastened to the disc 28 in any satisfactory manner as by rivets 32, or spot-welding or the like, but the general effect is the same as the construction shown in Figure 1.

This arrangement, as illustrated, will give a very smooth and flexible gear reduction of about ten to one, without increasing the length or size of the gang condenser, and is a construction which is very cheap to manufacture and install, and yet one that will wear a long time without loss of efficiency in operation.

What I claim is:

1. A speed reducing drive for an operating shaft carried by bearing supports, the shaft carrying a device to be turned, a driving stub shaft having a bearing attached directly to one of said operating shaft supports, the stub shaft extending through its bearing and through said operating shaft support and having in the extending end a groove-like formation with conical walls tapering toward each other, said operating shaft having a pair of grooves therein and disc-like resilient members fastened, one in each of said grooves, said disc-like members having an arcuate length of more than 180° but substantially less than 360° and having their free edges extending into frictional contact with the conically shaped walls of the groove in the stub shaft.

2. A speed reducing drive for an operating shaft carried by bearing supports, the shaft carrying a device to be turned, a driving stub shaft having a bearing attached directly to one of said operating shaft supports, the stub shaft extending through its bearing and through said operating shaft support and having in the extending end a groove-like formation with conical walls tapering toward each other, a pair of resilient members drivingly connected together and having an arcuate length of more than 180° but substantially less than 360°, and having their free edges spaced and extending into frictional contact with the conically shaped walls of the groove in the stub shaft, said operating shaft having a groove therein to receive and have fastened therein at least one of said resilient members.

FRIEDRICH C. NOLLER.